May 23, 1967 C. O. OLSON, JR 3,321,708
SAMPLING METHOD FOR RADAR RETURNS
Filed July 31, 1963
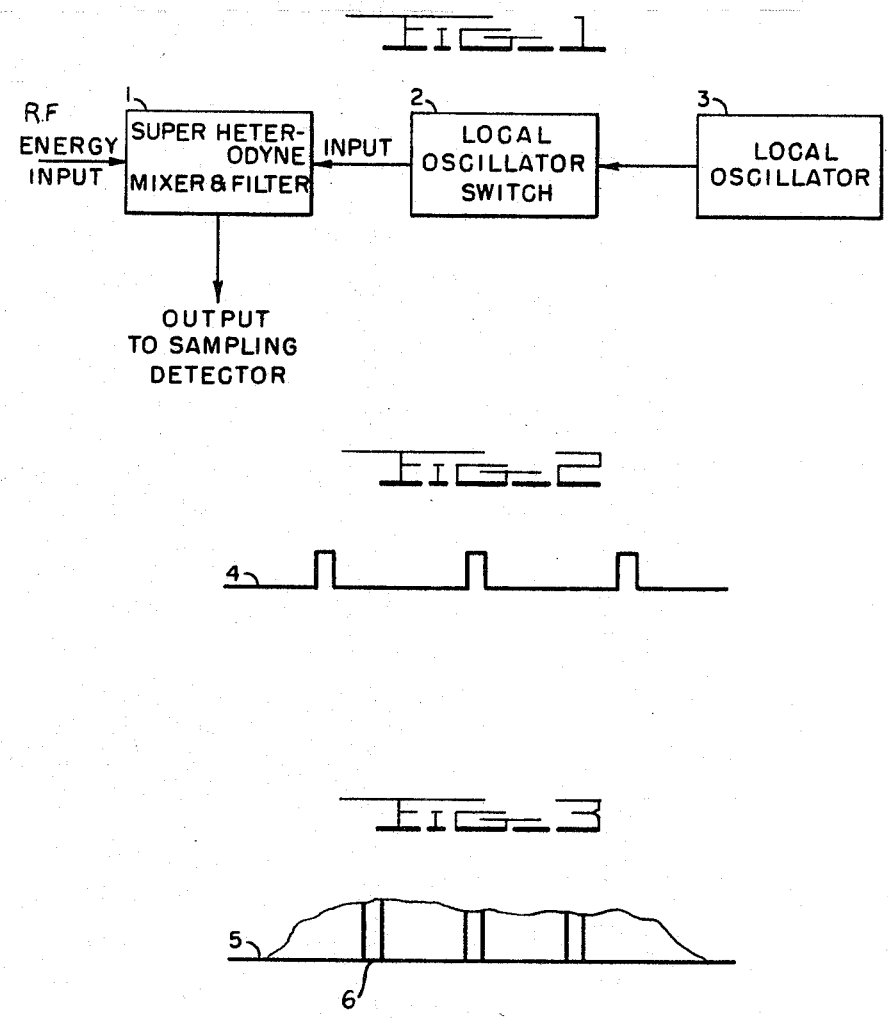
INVENTOR
CARL O. OLSON, JR.
BY *Richard C. Reed*
ATTORNEY 3,321,708
SAMPLING METHOD FOR RADAR RETURNS
Carl O. Olson, Jr., Burke, Va., assignor to the United States of America as represented by the Secretary of the Navy
Filed July 31, 1963, Ser. No. 299,122
1 Claim. (Cl. 325—322)

The invention described herein may be manufactured and used by or for the Government of the United States of America for governmental purposes without the payment of any royalties thereon or therefor.

The present invention relates to a heterodyne sampling system for radar returns, and more particularly to a sampling system for radar returns employing a superheterodyne mixer and a pulsed local oscillator as a sampling gate.

Information sampling in modern radar and communication art is generally accomplished by the insertion of a switching device in the main signal path of the receiver, wherein the switching device is generally in the form of a crystal switch or vacuum tube switch. At this point the small segments of the input information or waveform presented to the sampler are taken at specific intervals. These samples are then stretched in time and presented to the amplifier with the amplitude of these stretched pulses being proportional to the average amplitude of the input waveform. A disadvantage of using a crystal or vacuum tube as a switch device in this manner is that the bandwidth of the receiver for information handling capacity must be maintained from the antenna to the switch. A further disadvantage of the prior art in these devices is that the on to off ratio or dynamic range of the crystal or vacuum tube switch, which determines the sample height, is limited in such a manner as to degrade the available information. Also prior art devices have placed the switching device in front of the receiver which allows the on-off ratio to be amplified through the whole receiver, creating background noise which tends to cut down the useful interpretations of the desired radar returns being sampled.

A local oscillator in a superheterodyne receiver can be used as a sampling switch or gate in place of prior art devices, and by so employing the local oscillator, the bandwidth requirement for the same information handling capacity, of the receiver beyond the mixer is greatly reduced. Also the on-off ratio of the whole system is increased since gating the local oscillator causes the mixer to impede any energy flow into the system during off periods, and during the on period all the desired information is transmitted through the system with less background noise or distortion.

An object of the present invention is the provision of a different method of sampling radar returns or communication signals.

Another object is to use a superheterodyne mixer and a pulsed local oscillator as a sampling gate.

A final object of the present invention is the provision of a method of sampling radar and communication returns, thereby greatly increasing the information handling capacity of these systems.

Other objects and advantages of the invention will hereinafter become more fully apparent from the following description of the annexed drawings, which illustrated a preferred embodiment, and wherein:

FIG. 1 shows a block diagram of that portion of a complete radar system in which the superheterodyne mixer and pulsed local oscillator, used as a sampling gate, are located;

FIG. 2 shows the sequence of the gated pulse output of the mixer and local oscillator combination; and FIG. 3 illustrates the sampling, by the gated pulse output, of a radar return.

Briefly, the invention employs a local oscillator mixer combination as a sampling gate, so that only timed portions of a communication pulse, or radar return will be transmitted to a detector for analysis.

Referring now to the drawings, there is shown in FIG. 1 a local oscillator 3 connected to a local oscillator switch 2 which is in turn connected to a superheterodyne mixer 1. RF energy from a radar return is fed into any conventional radar system wherein it is amplified and then transmitted as energy input to the superheterodyne mixer 1. The local oscillator 3 is connected to an oscillator switch 2 which switches the local oscillator on and off at the desired sampling width and rate. Oscillator 3, however, could be driven as a switching device itself by either plate or grid pulsing at the sampling width and rate.

In operation, the RF input to receiver 1, shown by the envelope 5 in FIG. 3, is chopped or sectioned, so to speak, by a series of pulses 4 produced by oscillator switch 2. The sections 6, as shown in FIG. 3 are of a given width, corresponding to the one time of switch 2, and are pulsed to reoccur at a desired repetition frequency, sections 6 are, of course, pulses of energy at the 1F or video frequency and of a amplitude related to the envelope 5. At this point of operation, the information is in pulse form and the individual pulses can be somewhat artificially lengthened reducing bandwidth requirements. The samples are amplified through amplification channels and at the detection phase are time integrated and thereby once again the envelopes of the input energy are displayed in their original form at a slower time base. The pulses may now be handled by ordinary tape or punch card machines, and upon these machines being played back, a representation of the original energy envelope 5 is displayed or detected.

By simply connecting a well known oscillator in the mixer state of a superheterodyne receiver, so as to sample the input energy in small increments, the information handling of that system in which this is done, is increased by the ratio of the time interval sampled to the sampling width of the oscillator switch pulse, times the number of samples. For example: suppose the sampling width of the oscillator pulse is $.002 \times 10^{-6}$ sec. and the rate is 5000 samples per second, then by simple mathematics and by using the space between the samples, it is found that the information handling capacity of the system is increased many fold over the original system capacity. In addition, by stretching the pulses, the receiver bandwidth beyond the mixer which is necessary to handle the samples may be reduced. This in turn reduces the load or requirements of the system.

It can be readily seen therefore, that this same method could be used in a communication system, wherein one message could be sampled, and with proper gates on the receiver the time interval between these samples could be used to sample another message, etc. This sampling could be repeated until the time interval between the original samples was filled. It is immediately apparent that the information handling capacity of such a system would be greatly increased.

It can be seen therefore that by keying a local oscillator as a sampling switch, thereby sampling the input pulse energy to a system, that system will be able to handle a greater amount of information than it normally would. Also the bandwidth requirements of the system beyond the switching device for the same information handling capacity could be greatly decreased.

Obviously, many modifications and variations of the present invention are possible in the light of the above teachings. It is therefore to be understood that within the scope of the appended claim the invention may be practiced otherwise than as specifically described.

What is claimed is:

Apparatus for use in sampling RF radar return comprising:

a local oscillator to produce a signal at a first frequency;

switching means connected to said local oscillator to turn said oscillator signal on and off, the on time being very short compared to the off time and mixing and filtering means connected to receive both said oscillator on signal and said RF radar return to provide pulses of energy at a second frequency related to the difference of said RF and first frequency, said pulses from said mixing and filtering means being of a duration corresponding to said on time and of an amplitude related to the amplitude of said RF radar return.

References Cited by the Examiner

UNITED STATES PATENTS

| | | | |
|---|---|---|---|
| 2,778,933 | 1/1957 | Crist | 329—105 X |
| 2,937,273 | 5/1960 | Franco | 329—105 |
| 3,018,369 | 1/1962 | Holmes | 325—340 |

JOHN W. CALDWELL, *Acting Primary Examiner.*

J. T. STRATMAN, S. J. GLASSMAN,
*Assistant Examiners.*